(12) United States Patent
Edwards et al.

(10) Patent No.: US 9,131,115 B2
(45) Date of Patent: *Sep. 8, 2015

(54) APPARATUS AND METHOD FOR MANAGING MEDIA CONTENT

(75) Inventors: Gerard Edwards, Lansing, NY (US); Loraine Sanchez, San Antonio, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/468,503

(22) Filed: May 10, 2012

(65) Prior Publication Data

US 2012/0222060 A1 Aug. 30, 2012

Related U.S. Application Data

(63) Continuation of application No. 11/855,640, filed on Sep. 14, 2007, now Pat. No. 8,191,088.

(51) Int. Cl.
| | |
|---|---|
| H04N 5/445 | (2011.01) |
| H04N 7/173 | (2011.01) |
| G06F 17/30 | (2006.01) |
| H04N 21/414 | (2011.01) |
| H04N 21/442 | (2011.01) |
| H04N 21/466 | (2011.01) |
| H04N 21/658 | (2011.01) |

(52) U.S. Cl.
CPC ...... *H04N 7/17318* (2013.01); *G06F 17/30867* (2013.01); *H04N 21/41407* (2013.01); *H04N 21/44222* (2013.01); *H04N 21/4667* (2013.01); *H04N 21/6582* (2013.01)

(58) Field of Classification Search
CPC .................. H04N 21/232; H04N 21/4828
USPC ............................................. 725/53
See application file for complete search history.

(56) References Cited

U.S. PATENT DOCUMENTS

| | | | |
|---|---|---|---|
| 6,898,762 B2 | 5/2005 | Ellis et al. | |
| 7,908,628 B2 | 3/2011 | Swart | |
| 8,191,088 B2 * | 5/2012 | Edwards et al. | 725/23 |
| 2002/0038299 A1 * | 3/2002 | Zernik et al. | 707/3 |
| 2002/0056088 A1 * | 5/2002 | Silva et al. | 725/9 |
| 2002/0059094 A1 * | 5/2002 | Hosea et al. | 705/10 |
| 2002/0112237 A1 | 8/2002 | Kelts | |
| 2003/0177495 A1 | 9/2003 | Needham | |
| 2003/0237097 A1 | 12/2003 | Marshall et al. | |
| 2005/0034147 A1 | 2/2005 | Best et al. | |

(Continued)

FOREIGN PATENT DOCUMENTS

| | | |
|---|---|---|
| CA | 2492612 | 6/2006 |
| WO | WO-03/073754 | 9/2003 |

*Primary Examiner* — Junior Mendoza
(74) *Attorney, Agent, or Firm* — Guntin & Gust, PLC; Jay H. Anderson (57) ABSTRACT

A system that incorporates teachings of the present disclosure may include, for example, a set top box having a controller to present media content, and provide access to related media content based upon access information, where the related media content is determined based upon monitoring of the media content, where the related media content is retrieved based on a query of a plurality of sources over the internet for ancillary information, and where the access information is associated with each of the plurality of sources and the ancillary information is at least one among a video blog, a pod cast or a website. Other embodiments are disclosed.

19 Claims, 5 Drawing Sheets

(56) References Cited

U.S. PATENT DOCUMENTS

| | | |
|---|---|---|
| 2005/0066352 A1* | 3/2005 | Herley .......................... 725/19 |
| 2005/0210507 A1 | 9/2005 | Hawkins et al. |
| 2006/0034314 A1 | 2/2006 | Coppens |
| 2006/0127039 A1 | 6/2006 | van Stam |
| 2007/0089158 A1 | 4/2007 | Clark |
| 2007/0118873 A1 | 5/2007 | Houh et al. |
| 2007/0154163 A1 | 7/2007 | Cordray |
| 2007/0157242 A1 | 7/2007 | Cordray et al. |
| 2007/0180465 A1 | 8/2007 | Ou |
| 2007/0214488 A1* | 9/2007 | Nguyen et al. ................ 725/134 |
| 2008/0066099 A1* | 3/2008 | Brodersen et al. ............. 725/35 |
| 2008/0092156 A1 | 4/2008 | Ferrone |
| 2008/0098432 A1* | 4/2008 | Hardacker et al. ............ 725/51 |
| 2008/0204595 A1* | 8/2008 | Rathod et al. ................ 348/465 |
| 2008/0271078 A1 | 10/2008 | Gossweiler et al. |

\* cited by examiner

APPARATUS AND METHOD FOR MANAGING MEDIA CONTENT

CROSS-REFERENCE TO RELATED APPLICATIONS

This application is a continuation of U.S. patent application Ser. No. 11/855,640 filed Sep. 14, 2007, which is incorporated herein by reference in its entirety.

FIELD OF THE DISCLOSURE

The present disclosure relates generally to communication services and more specifically to an apparatus and method for managing media content.

BACKGROUND

Media content (e.g., television programs, documentaries, and movies) often has related content and/or ancillary information associated with the media content. Television shows can have previously-aired episodes that contain an inter-related plot, while other information, such as blogs, can be related to a particular show. However, finding and accessing the related content and ancillary information can be time-consuming and sometimes costly.

DETAILED DESCRIPTION

In one embodiment of the present disclosure, a computer-readable storage medium can have computer instructions for monitoring media content associated with a user of a set top box, determining related media content for the media content associated with the user, querying media sources over the Internet for the related media content, retrieving access information associated with each of the media sources and the related media content, presenting the user with viewing options based at least in part on the media content and the access information, and providing the user with access to the related media content based upon a selection of one of the viewing options by the user.

In one embodiment of the present disclosure, a server can have a controller to monitor media content associated with a set top box, determine related media content for the media content associated with the set top box, query a plurality of sources over the Internet for the related media content and access information associated with each of the plurality of sources, and provide a user of the set top box with access to a selected one of the related media content based upon the access information.

In one embodiment of the present disclosure, a server can have a controller to monitor media content associated with a set top box, query a plurality of sources over the Internet for ancillary information associated with the media content, parse the ancillary information based on a content criteria, present parsed ancillary information to the set top box, and provide a user of the set top box with access to a selection of the parsed ancillary information.

In one embodiment of the present disclosure, a set top box can have a controller to present media content to a user, and provide the user with access to related media content based upon access information, wherein the related media content is determined based upon monitoring of the media content, wherein the related media content is retrieved based on a query of a plurality of sources over the Internet, and wherein the access information is associated with each of the plurality of sources.

In one embodiment of the present disclosure, a method can involve monitoring media content associated with a set top box, determining related media content for the media content, querying media sources over the Internet for the related media content, retrieving access information associated with each of the media sources, and presenting a user with viewing options based on the media content and the access information.

Figure 1:
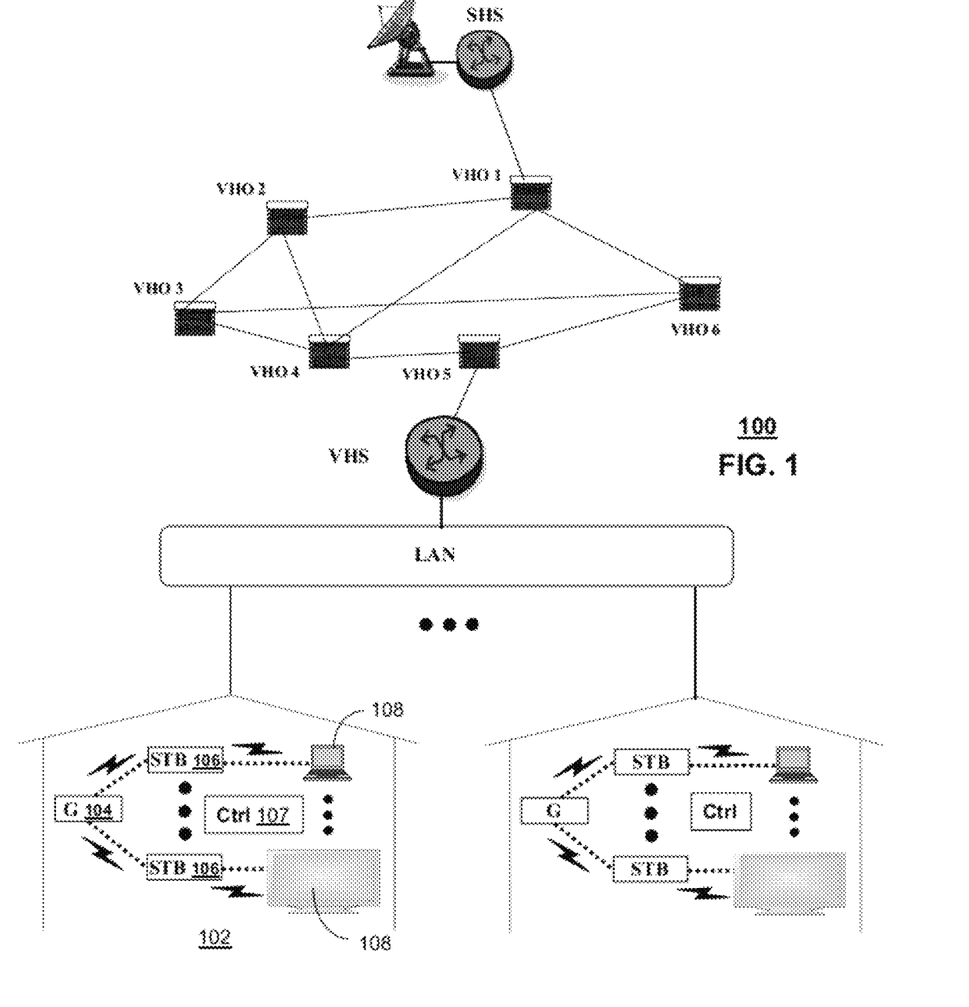
FIGS. 1-3 depict exemplary embodiments of a communication system.

FIG. 1 depicts an exemplary embodiment of a communication system 100 employing an IPTV broadcast media architecture. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control). Unicast traffic can also be exchanged between the media receivers 106 and subsystems of the IPTV media system 100 for services such as video-on-demand (VoD).

Figure 2:
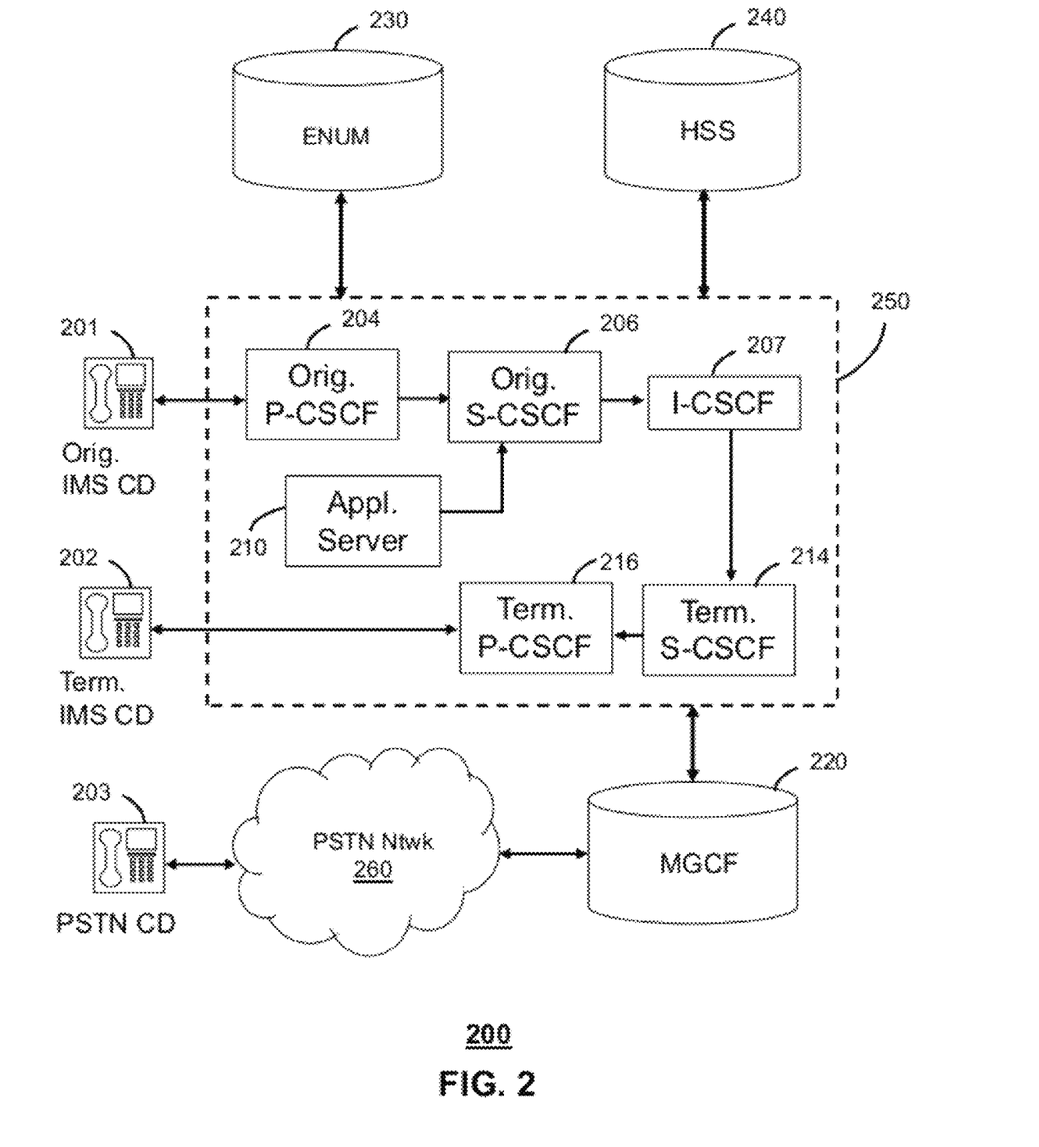

FIG. 2 depicts an exemplary embodiment of a communication system 200 employing a IP Multimedia Subsystem (IMS) network architecture. Communication system 200 can be overlaid or operably coupled with communication system 100 as another representative embodiment of communication system 100.

The communication 200 can comprise a Home Subscriber Server (HSS) 240, a tElephone NUmber Mapping (ENUM) server 230, and network elements of an IMS network 250. The IMS network 250 can be coupled to IMS compliant communication devices (CD) 201, 202 (e.g., set top boxes) or a Public Switched Telephone Network (PSTN) CD 203 using a Media Gateway Control Function (MGCF) 220 that connects the call through a common PSTN network 260. CDs 201-203 can be fixed, mobile, wireless and/or wired devices.

IMS CDs 201, 202 can register with the IMS network 250 by contacting a Proxy Call Session Control Function (P-CSCF) which communicates with a corresponding Serving CSCF (S-CSCF) to register the CDs with an Authentication, Authorization and Accounting (AAA) support by the HSS 240. To accomplish a communication session between CDs, an originating IMS CD 201 can submit a SIP INVITE message to an originating P-CSCF 204 which communicates with a corresponding originating S-CSCF 206. The originating S-CSCF 206 can submit the SIP INVITE message to an application server (AS) such as reference 210 that can provide a variety of services to IMS subscribers. For example, the application server 210 can be used to perform originating treatment functions on the calling party number received by the originating S-CSCF 206 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 206 can submit queries to the ENUM system 230 to translate an E.164 telephone number to a SIP Uniform Resource Identifier (URI) if the targeted communication device is IMS compliant. If the targeted communication device is a PSTN device, the ENUM system 230 will respond with an unsuccessful address resolution and the S-CSCF 206 will forward the call to the MGCF 220 via a Breakout Gateway Control Function (not shown).

When the ENUM server 230 returns a SIP URI, the SIP URI is used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214 which can call on an application server similar to reference 210 to perform the originating treatment telephony functions described earlier. The terminating S-CSCF 214 can then identify a terminating P-CSCF 216 associated with the terminating CD 202. The P-CSCF 216 then signals the CD 202 to establish communications. The aforementioned process is symmetrical. Accordingly, the terms "originating" and "terminating" in FIG. 2 can be interchanged.

Figure 3:
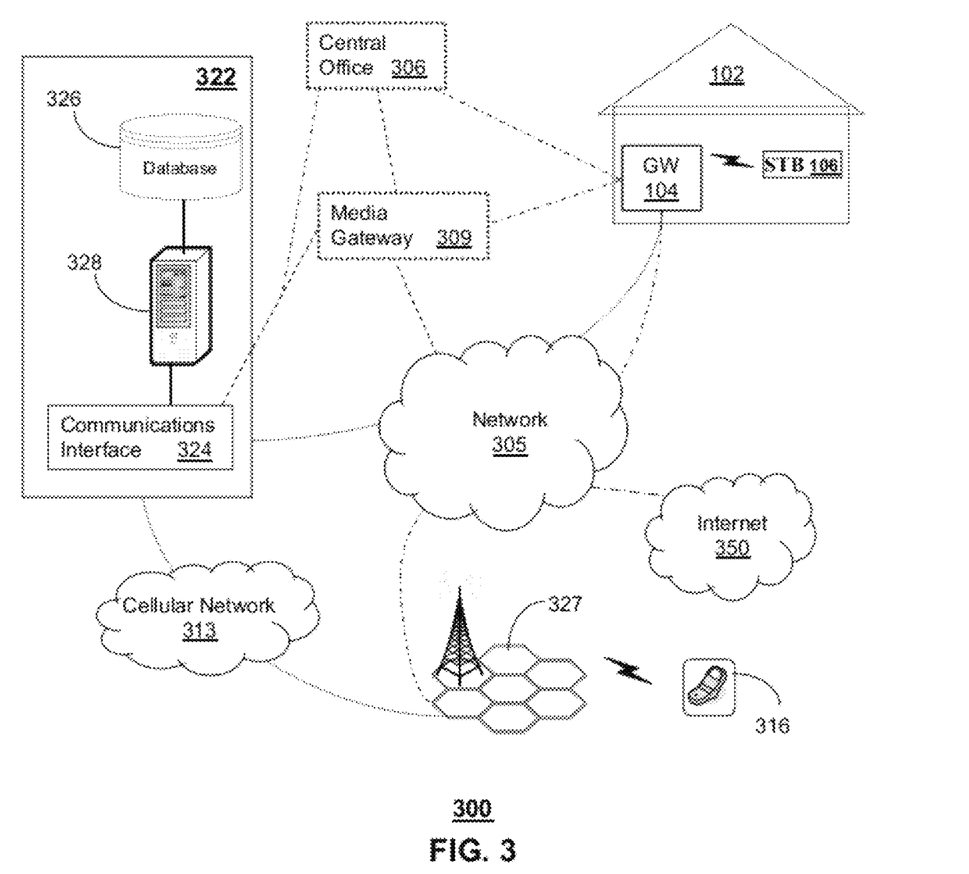

FIG. 3 depicts an exemplary embodiment of a communication system 300 employing communication devices, such as set top box 106, communicating by way of wireless access points (WAPs) and/or wired infrastructure with other communication devices and/or a network proxy or web server 322, which collectively operate in the communication system 300. Communication system 300 can be overlaid or operably coupled with communication systems 100 and/or 200 as another representative embodiment of the communication system.

The set top boxes 106 can be multimedia devices for communicating video, voice and/or data, as well as receiving multimedia programming. The set top boxes 106 can include a tuner for receipt of the media programming, and can include a digital video recorder (DVR) or personal video recorder (PVR). The set top boxes 106 can be multimode communication devices that can communicate via a number of modes of communication, including wired and/or wireless communication, and can communicate with other devices, such as over the Internet 350. The communication system 300 can comprise a packet-switched network 305 that can be in communication with other devices or networks of the Internet 350. The packet-switched network can be an Internet Service Provider (ISP) network 305. The network 305 can be coupled to the network proxy 322, the cellular network 313 and network elements located in one or more of the buildings 102 representing an enterprise or residence. The ISP network 305 can utilize technology for transporting Internet traffic.

In an enterprise setting, the building 102 can include the gateway 104 that provides voice video and/or data connectivity services to the set top boxes 106. In a residential setting, the building 102 can include a gateway 104 represented by, for example, a residential gateway coupled to central office 306 utilizing conventional telephonic switching for processing calls with third parties.

The network proxy 322 can be used to control operations of a media gateway 309, the central office 306 and the gateway 104. Communications between the network proxy 322, the set top box 106 and other network elements of the communication system 300 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 322 can comprise a communications interface 324 that utilizes common technology for communicating over an IP interface with the network 305, the media gateway 309, the cellular network 313, and/or the gateway 104. By way of the communications interface 324, the network proxy 322 can direct by common means any of the foregoing network elements to establish packet switched data, voice, and/or video connections throughout the communication system 300. The network proxy 322 can further comprise a memory 326 (such as a high capacity storage medium) embodied in this illustration as a database, and a controller 328 that makes use of computing technology such as a desktop computer, or scalable server for controlling operations of the network proxy 322. The network proxy 322 can operate as an IP Multimedia Subsystem (IMS) conforming in part to protocols defined by standards bodies such as 3GPP (Third Generation Partnership Protocol).

Under the control of the network proxy 322, the media gateway 309 can link packet-switched and circuit-switched technologies such as the cellular network 313 (or central office 306) and the network 305, such as an ISP network. The media gateway 309 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. MGCP can therefore be used to set up, maintain, and terminate calls between multiple disparate network elements of the communication system 300. The media gateway 309 can therefore support hybrid communication environments for the set top boxes 106 or other communication devices, including VoIP terminals.

The central office 306 can house common network switching equipment for distributing local and long-distance telecommunication services supplied by network 305 to buildings 102 (such as dwellings or commercial enterprises). Telecommunication services of the central office 306 can include traditional POTS (Plain Old Telephone Service) and broadband services such as HDTV, DSL, VoIP (Voice over Internet Protocol), IPTV (Internet Protocol Television), Internet services, and so on. The communication system 300 can utilize common computing and communications technologies to support circuit-switched and/or packet-switched communications.

The cellular network 313 can support voice and data services over a number of access technologies such as GSM-GPRS, EDGE, CDMA-1X, UMTS, WiMAX, software defined radio (SDR), and other known and future technologies. The cellular network 313 can be coupled to base stations 327 under a frequency-reuse plan for communicating over-the-air with other communication devices of the communication system, including set top boxes 106.

Figure 4:
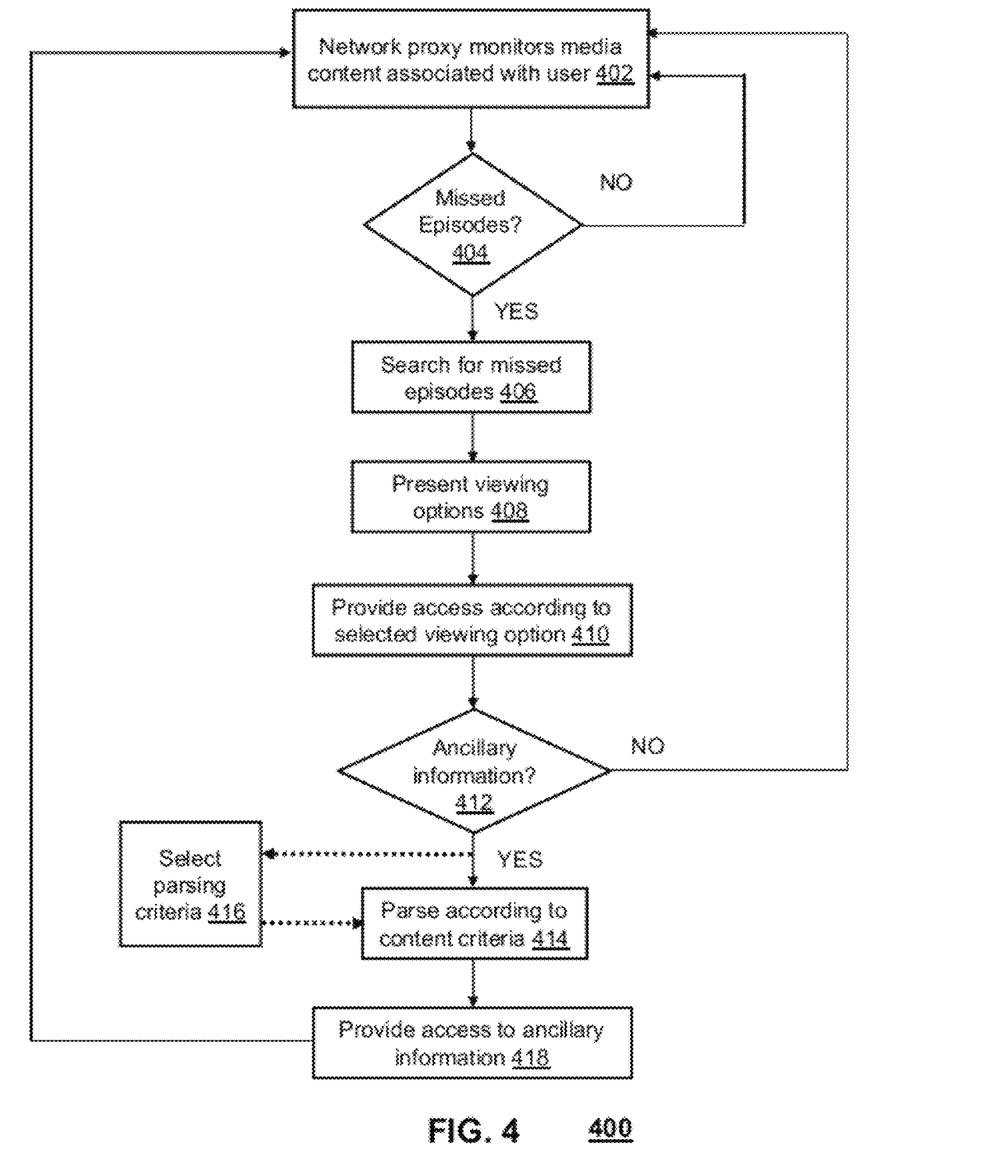
FIG. 4 depicts an exemplary method operating in portions of the communication systems.

FIG. 4 depicts an exemplary method 400 operating in portions of the communication systems 100-300. Method 400 has variants as depicted by the dashed lines. It would be apparent to an artisan with ordinary skill in the art that other embodiments not depicted in FIG. 4 are possible without departing from the scope of the claims described below. For convenience, reference to one or more features of communication system 300 as used in the following paragraphs can mean one or more features of the communication systems 100, 200, and 300 singly or in combination.

Method 400 begins with step 402 in which the network proxy 322 can monitor the media content associated with a user. Media content associated with a user can include content that is being presented (e.g., during playback from a recording by a DVR, regularly scheduled programming, video-on-demand, etc.) and/or content that is scheduled to be recorded by the DVR of the set top box 106. The media content can also be associated with one or more users of a group of users of a set top box 106, such as through use of user profiles that are required to activate use of the set top box. In one embodiment, the network proxy 322 can include a dedicated server that monitors the media content associated with the users of the set top boxes 106 throughout the communication system.

In step 404, the network proxy 322 can determine if there are one or more episodes, prequels, sequels or other content that is related to the media content associated with the user and/or the set top box 106. For example, if a user has scheduled a recording of the third part of a three-part documentary then the network proxy 322 can determine that related media content exists, e.g., parts I and II. The determination of one or more episodes or prequels that are related to the media content associated with the user and/or set top box can be based upon sequels to a movie or earlier episodes of a TV show, such as a mini-series. The present disclosure also contemplates the determination of other related media content, including subsequent episodes and related programming. For example, television series programming can have related shows where related content is provided in more than one of the shows, such as the several "Law & Order" television series where a plot is presented in more than one of the different shows.

The related media content can be based upon a common character appearing in a plurality of media content or a common plot being presented through a plurality of media content. In one embodiment, the determination of the existence of related media content can be a web-based search or query. The present disclosure also contemplates that the determination of any related media content can be based upon other sources, including a database (e.g., a producer of a series of media content provides titles, summaries, etc. to populate the database) or an electronic program guide (EPG).

If there are no episodes, prequels, sequels or otherwise related media content then the network proxy 322 can continue to monitor the media content associated with a user and/or a set top box. If on the other hand, it is determined that related media content does exist then in step 406 the network proxy 322 searches for the related media content. The search for the related media content can be an Internet search and can include known databases that store related media content. For example, the search can be conducted in connection with one or more of iTunes, AOL TV, or Akimbo. As another example, the network proxy 322 can search and remember databases that store particular media content, and search those databases first during a subsequent search for the same or similar related media content. The search for the related media content can retrieve access information related to the accessibility of the related media content and/or the accessibility of the particular source of the related media content. The access information can vary and can include cost (e.g., free, per download, etc.), download type (e.g., streaming, progressive, full, etc.), file format, quality, and so forth.

In step 408, the network proxy 322 can present options to the user for viewing the related media content. The options can include the access information, such as cost, download type, file format, quality, and so forth. For example, the network proxy 322 can present the availability of a previously-aired episode of a mini-series from a plurality of sources along with the access information related to each of those sources. The user can then determine which of the sources, if any, should be used to obtain the related media content based upon the access information, including the cost of the download. As another example, a user can determine whether to retrieve a free version of the related media content as compared to paying for one or more other versions of the related media content. Other factors can also be a basis of the user's selection of the viewing option, such as the quality of the free version or the download type. For example, the network proxy 322 can determine and remember the quality of a particular related media content so that a subsequent user has this information prior to deciding to access the related media content, or the network proxy can determine and remember the quality of a different related media content but from the same source.

The viewing options can be presented at the time the user of the STB 106 is scheduling the recording, is watching a playback of the recording, or is watching the programming at its regularly scheduled time. The options can also be provided at some other time, such as near the scheduled time of the programming. The form of notice of the options can vary. For example, a picture-in-picture (PIP), pop-up window or transparent message can be utilized to present the information. In one embodiment, a visual message of the availability of related media content can be displayed on the recording screen as part of the normal steps taken in scheduling a recording with the STB 106.

In step 410, the network proxy 322 can provide the user with access to the related media content according to a selection of the viewing options by the user. The type of access provided can vary. For example, the related media content can be downloaded and stored into the DVR of the user's set top box, or a link can be provided for accessing at a later time from the source's website. In another embodiment, the related media content can be stored on a back-end server until the user desires to watch the related media content.

In step 412, the network proxy 322 can determine if there is ancillary information or data available that is associated with the media content. The ancillary information can vary, and can include blogs (e.g., video blogs), pod casts, related websites, unrelated websites with related information, and so forth. In another embodiment, the ancillary information can include hard goods that are associated with the media content, such as clothing, ornaments and other items that can be offered for sale. The ancillary information can be based upon a search of the Internet for such information, and can include a search of known databases that store related media content. In one embodiment, the network proxy 322 can also store ancillary information. For example, the network proxy 322 can search and remember databases that store particular ancillary information associated with media content, and search those databases first during a presentation of the same or similar media content. If no ancillary information exists for a particular media content then the network proxy 322 can continue to monitor the media content associated with the user and/or set top box.

If on the other hand, it is determined that ancillary information exists then the network proxy 322 can parse the ancillary information based upon one or more content criteria, as in step 414. For example, a search or query based upon a title of a television show may result in several hundred hits. The network proxy 322 can then parse the hits based upon the one or more content criteria, such as an actor's name, genre, QoS, cost, and so forth. The particular content criteria used for parsing can vary.

In one embodiment, the network proxy 322 can present the user with a selection of content criteria or otherwise receive input from the user to determine the content criteria, as in step 416. For example, a user may desire to parse the ancillary information based upon a number of actors in a show, but only where access to the ancillary information is free.

The parsed ancillary information can be presented at the time the user of the STB 106 is scheduling the recording, is watching a playback of the recording, or is watching the programming at its regularly scheduled time. The parsed ancillary information can also be provided at some other time, such as near the scheduled time of the programming A Graphical User Interface (GUI) used for presenting the ancillary information can vary. For example, a picture-in-picture (PIP), pop-up window or transparent message can be utilized to present the information and/or present a notice of the information being stored or otherwise accessible.

In step 418, the network proxy 322 can provide the user with access to the ancillary information associated with the media content, such as according to a selection of one or more of the parsed search results. The type of access provided can vary. For example, the ancillary information can be downloaded and stored into the DVR of the user's set top box, or a link can be provided for accessing at a later time from the source's website. In another embodiment, the ancillary information can be stored on a back-end server until the user desires to view the ancillary information. In yet another embodiment, the network proxy 322 can utilize the ancillary information and the user's accessing of the ancillary information to determine preferences and/or parsing criteria for the user. For example, a preference can be established for a user who purchases shirts related to various television shows where the availability of the shirts was provided as the ancillary information. Any later presented ancillary information for the user can then be parsed based in part on clothing, shirts and the like.

Upon reviewing the aforementioned embodiments, it would be evident to an artisan with ordinary skill in the art that said embodiments can be modified, reduced, or enhanced without departing from the scope and spirit of the claims described below. In one embodiment, the STB 106 can perform one or more of the steps described herein with respect to the network proxy 322, such as the monitoring of the media content associated with the user, the search for related media content, and/or the searching and parsing ancillary information associated with the media content. In another embodiment, a group of STBs 106 can be in communication with each other such as through use of the network proxy 322 or through use of a de-centralized system so that the search for related media content, and/or the search for ancillary information associated with the media content can be performed within the group (e.g., in addition to the Internet search).

As another example, the user of the STB 106 can designate types of media content for which method 400 is to apply. For instance, a user may desire to be provided with the related media content and/or the ancillary information associated with the media content for mini-series, but not for movies. The network proxy 322 can also determine the degree of relation between the media content and the related media content. For example, the first episode of a TV series that is in its second season may not be related enough to the current episode to warrant viewing. The present disclosure also contemplates providing notice of some or all of the related media content, but searching only a portion of that related media content, such as pursuant to a selection by the user.

These are but a few examples of modifications that can be applied to the present disclosure without departing from the scope of the claims. Accordingly, the reader is directed to the claims section for a fuller understanding of the breadth and scope of the present disclosure.

Figure 5:
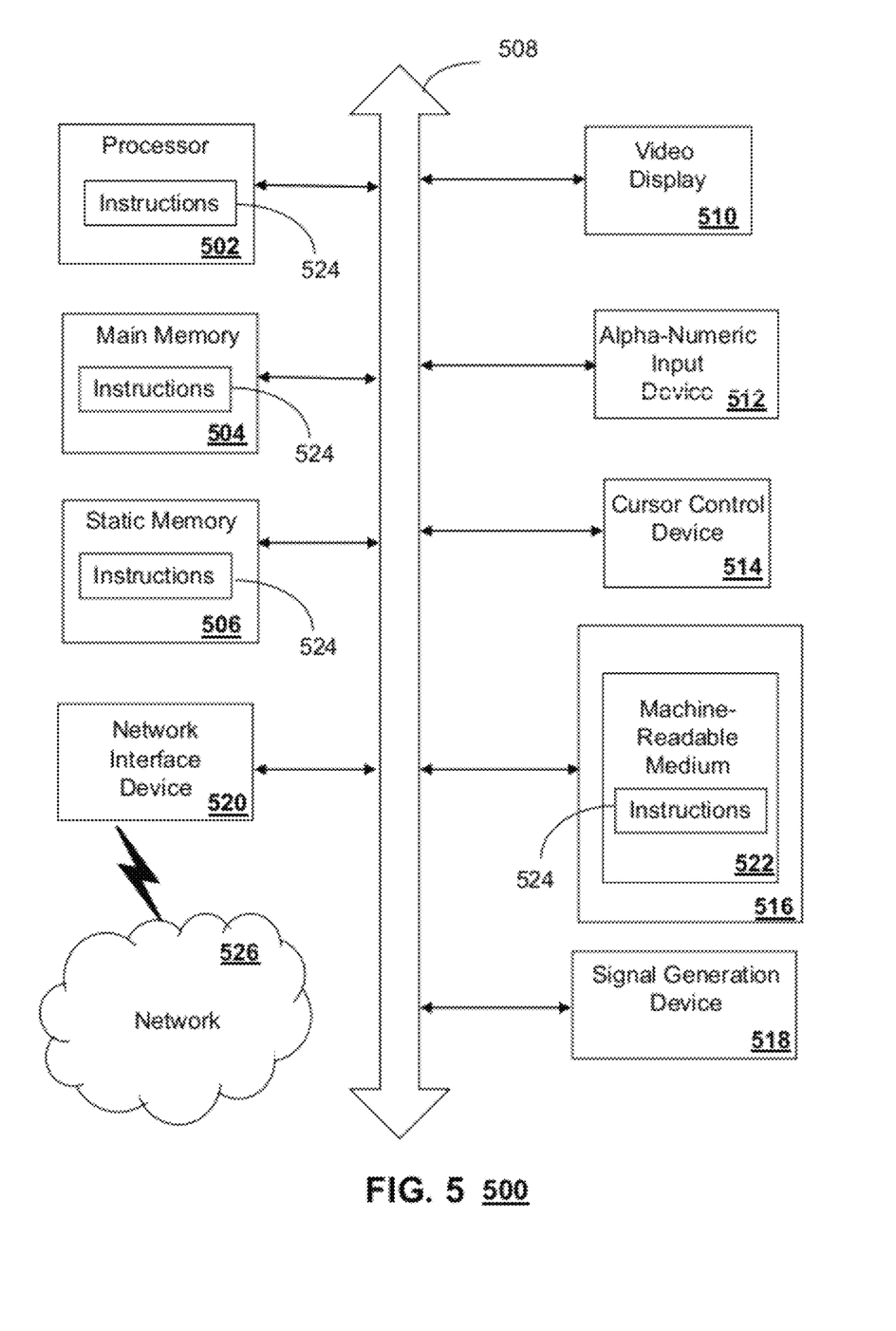
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a mass storage medium 516, a signal generation device 518 (e.g., a speaker or remote control) and a network interface device 520.

The mass storage medium 516 may include a computer-readable storage medium 522 on which is stored one or more sets of instructions (e.g., software 524) embodying any one or more of the methodologies or functions described herein, including those methods illustrated above. The computer-readable storage medium 522 can be an electromechanical medium such as a common disk drive, or a mass storage medium with no moving parts such as Flash or like non-volatile memories. The instructions 524 may also reside, completely or at least partially, within the main memory 504, the static memory 506, and/or within the processor 502 during execution thereof by the computer system 500. The main memory 504 and the processor 502 also may constitute computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable storage medium 522 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a computer-readable storage medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions which when executed by a processor cause the processor to perform operations comprising:

monitoring media content for presentation by a set top box, wherein the monitoring of the media content is based on playback recordings from a recording device;

monitoring a query for ancillary information;

determining related media content having a relation to the media content, wherein the media content and the related media content differ in content, the determining being performed in accordance with a search of a plurality of databases, wherein a database of the plurality of databases previously determined to store similar related media content is searched first for the related media content;

querying a plurality of media sources for a portion of the ancillary information that is associated with the related media content;

parsing the portion of the ancillary information based on content criteria to generate parsed ancillary information, wherein the parsed ancillary information is associated with a video blog, a pod cast, or a website;

retrieving access information associated with each of the plurality of media sources and the related media content, wherein the access information associated with a media source of the plurality of media sources comprises:

descriptive information associated with the media source, the related media content, or both, and identifying complementary content, fee-based content, or a combination thereof, information associated with accessibility of the related media content, the media source, or a combination thereof, and a cost, a download type, a file format, or a combination thereof, for the related media content;

presenting viewing options based at least in part on the media content and the parsed ancillary information; and providing the set top box access to the parsed ancillary information based upon a selection of the viewing options or the access information.

2. The non-transitory machine-readable storage medium of claim 1, wherein the viewing options further include an option to view the related media content.

3. The non-transitory machine-readable storage medium of claim 1, wherein the operations further comprise querying a plurality of other set top boxes for the related media content.

4. The non-transitory machine-readable storage medium of claim 1, wherein the operations further comprise:

determining a plurality of related media content having a relation to the media content; and querying the plurality of media sources for at least a portion of the plurality of related media content.

5. The non-transitory machine-readable storage medium of claim 1, wherein the monitoring of the media content is based on information extracted from playback recordings or viewing of regularly scheduled recordings, wherein the scheduled recordings are of media programming scheduled for future broadcast.

6. A server, comprising:

a memory storing executable instructions;

a controller coupled to the memory, wherein the controller, responsive to executing the instructions, performs operations comprising:

monitoring media content for presentation by a media processor, wherein the monitoring of the media content is based on playback recordings from a recording device;

searching for related media content having a relation to the media content, wherein the media content and the related media content are distinct, the searching including a search of a plurality of databases, wherein a database of the plurality of databases previously determined to store similar related media content is searched first for the related media content;

querying a plurality of sources for ancillary information associated with the related media content;

parsing a portion of the ancillary information based on content criteria to generate parsed ancillary information, wherein the parsed ancillary information is associated with a video blog, a pod cast, or a website;

retrieving access information associated with each of the plurality of sources, the related media content, or the parsed ancillary information, wherein the access information associated with a source of the plurality of sources comprises:

descriptive information associated with the source, the related media content, the parsed ancillary information, or a combination thereof, and identifying complementary content, fee-based content, or a combination thereof, information associated with accessibility of the related media content, the source, or a combination thereof, and a cost, a download type, a file format, or a combination thereof, for the related media content; and providing at the media processor access to the related media content or the parsed ancillary information according to the access information.

7. The server of claim 6, wherein the related media content is an earlier-aired episode of a TV program, a sequel to a movie, a prequel to the movie, or a portion of a mini-series of TV programs.

8. The server of claim 6, wherein the operations further comprise:

querying a database for the related media content and the access information; and storing information associated with a content of the database.

9. The server of claim 6, wherein the operations further comprise:

determining a quality of the related media content; and storing information associated with the quality of the related media content.

10. The server of claim 6, wherein the operations further comprise querying a different media processor for the related media content.

11. The server of claim 6, wherein the monitoring of the media content is based on playback of media recordings or viewing of regularly scheduled media programming.

12. The server of claim 6, wherein the monitoring of the media content is based on a user profile.

13. A set top box, comprising:

a memory storing executable instructions;

a controller coupled to the memory, wherein the controller, responsive to executing the instructions, performs operations comprising:

monitoring media content presented by the set top box, wherein the monitoring of the media content is based on playback recordings from a recording device;

searching for related media content having a relation to the media content, wherein the media content and the related media content are distinct, the searching including a search of a plurality of databases, wherein a database of the plurality of databases previously determined to store similar related media content is searched first for the related media content;

querying a plurality of sources for ancillary information associated with the related media content;

parsing a portion of the ancillary information based on content criteria to generate parsed ancillary information;

retrieving access information associated with each of the plurality of sources, the related media content, or the parsed ancillary information, wherein the access information associated with a source of the plurality of sources comprises:

descriptive information associated with the source, the related media content, the parsed ancillary information, or any combination thereof, and identifying complementary content, fee-based content, or a combination thereof, information associated with accessibility of the related media content, the source, or a combination thereof, and a cost, a download type, a file format, or a combination thereof, for the related media content; and presenting the related media content or the parsed ancillary information according to the access information.

14. The set top box of claim 13, wherein the related media content is one among an earlier-aired episode of a TV program, a sequel to a movie, a prequel to the movie, or a portion of a mini-series of TV programs.

15. The set top box of claim 13, wherein the operations further comprise:

determining a quality of the related media content; and storing information associated with the quality of the related media content.

16. The set top box of claim 13, wherein the operations further comprise querying a different set top box for the related media content.

17. The set top box of claim 13, wherein the operations further comprise presenting viewing options based on the access information.

18. The set top box of claim 13, wherein the monitoring of the media content is based on playback of recordings or viewing of regularly scheduled programming.

19. The set top box of claim 13, wherein the monitoring of the media content is based on a user profile.

* * * * *